US012562959B2

(12) United States Patent
Marquezan et al.

(10) Patent No.: US 12,562,959 B2
(45) Date of Patent: Feb. 24, 2026

(54) ENTITIES AND METHODS FOR AUTOMATIC CONFIGURATION AND SELECTION OF ANALYTICS NETWORK FUNCTION INSTANCES IN 5G NETWORKS

(71) Applicant: Huawei Technologies Co., Ltd., Shenzhen (CN)

(72) Inventors: Clarissa Marquezan, Munich (DE); Riccardo Trivisonno, Munich (DE); Yang Xin, Shanghai (CN); Mirko Schramm, Berlin (DE); Xiaobo Wu, Shenzhen (CN); Qing Wei, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 749 days.

(21) Appl. No.: 17/404,830

(22) Filed: Aug. 17, 2021

(65) Prior Publication Data
US 2021/0377754 A1 Dec. 2, 2021

Related U.S. Application Data

(63) Continuation of application No. PCT/EP2019/053988, filed on Feb. 18, 2019.

(51) Int. Cl.
| | |
|---|---|
| *H04L 41/0853* | (2022.01) |
| *H04L 43/0817* | (2022.01) |
| *H04W 24/02* | (2009.01) |

(52) U.S. Cl.
CPC ...... *H04L 41/0853* (2013.01); *H04L 43/0817* (2013.01); *H04W 24/02* (2013.01)

(58) Field of Classification Search
CPC .... H04W 24/02; H04L 41/14; H04L 43/0817; H04L 41/0853
See application file for complete search history.

(56) References Cited

U.S. PATENT DOCUMENTS

| | | | |
|---|---|---|---|
| 2018/0054744 A1 | 2/2018 | Smith et al. | |
| 2018/0262924 A1 | 9/2018 | Dao et al. | |
| 2019/0053308 A1 | 2/2019 | Zamora et al. | |
| 2019/0222489 A1* | 7/2019 | Shan | H04M 15/8022 |
| 2020/0252813 A1* | 8/2020 | Li | H04W 24/08 |
| 2021/0176650 A1* | 6/2021 | Wang | H04W 8/14 |

FOREIGN PATENT DOCUMENTS

| | | |
|---|---|---|
| CN | 108401275 A | 8/2018 |
| CN | 111095970 A | 5/2020 |
| RU | 2643451 C2 | 2/2018 |

(Continued)

OTHER PUBLICATIONS

3GPP TS 23.501 v15.4.0 (Year: 2018).*

(Continued)

*Primary Examiner* — Kibrom T Hailu
(74) *Attorney, Agent, or Firm* — Slater Matsil, LLP

(57) ABSTRACT

The disclosure relates to a first network entity for a mobile communication network. The first network entity is configured to: provide registration information to a second network entity of the mobile communication network, wherein the registration information is based on a scope of generated analytics, the scope of generated analytics defining the capability of the first entity to generate analytics information.

21 Claims, 6 Drawing Sheets

(56)                  References Cited

FOREIGN PATENT DOCUMENTS

| | | | |
|---|---|---|---|
| WO | 2019001376 A1 | 1/2019 |
| WO | 2019032968 A1 | 2/2019 |
| WO | 2020066890 A1 | 4/2020 |

OTHER PUBLICATIONS

3GPP TS 23.502 Draft V16.0.0+ (Feb. 2019), "3rd Generation Partnership Project; Technical Specification Group Services and System Aspects; Procedures for the 5G System; Stage 2 (Release 16)," 378 pages.

3rd Generation Partnership Project; Technical Specification Group Services and System Aspects; Study of Enablers for Network Automation for 5G (Release 16), 3GPP TR 23.791, Dec. 2018, 121 Pages, V2.0.0.

3GPP TR 23.791 V16.0.0 (Dec. 2018), 3rd Generation Partnership Project; Technical Specification Group Services and System Aspects; Study of Enablers for Network Automation for 5G (Release 16), 121 pages.

3GPP TS 23.501 V1.4.0 (Sep. 2017), 3rd Generation Partnership Project; Technical Specification Group Services and System Aspects; System Architecture for the 5G System; Stage 2 (Release 15), 151 pages.

3GPP TS 23.502 V15.4.1 (Jan. 2019), 3rd Generation Partnership Project; Technical Specification Group Services and System Aspects; Procedures for the 5G System; Stage 2 (Release 15), 347 pages.

Ericsson, "Removing Editor's note on how to register analytic metadata in NRF", SA WG2 Meeting #S2-129, 82-1810226, Dongguan, P. R. China, Oct. 15-19, 2018, 5 pages.

Huawei et al., "CR for TS 23.501 based on conclusion of eNA TR 23.791", 3GPP TSG-SA WG2 Meeting #130, 82-1901288, Kochi, India, Jan. 21-25, 2019, 8 pages.

3GPP TS 23.501 Draft V16.0.0+ (Feb. 2019), 3rd Generation Partnership Project; Technical Specification Group Services and System Aspects; System Architecture for the 5G System; Stage 2 (Release 16), 282 pages.

3GPP TS 23.288 V0.1.0 (Feb. 2019), 3rd Generation Partnership Project; Technical Specification Group Services and System Aspects; Architecture enhancements for 5G System (5GS) to support network data analytics services; (Release 16), 40 pages.

ETSI TS 138 508-1, 5G; 5GS; User Equipment (UE) conformance specification; Part 1: Common test environment, May 2019, 457 Pages, V15.3.0.

* cited by examiner

ENTITIES AND METHODS FOR AUTOMATIC CONFIGURATION AND SELECTION OF ANALYTICS NETWORK FUNCTION INSTANCES IN 5G NETWORKS

CROSS-REFERENCE TO RELATED APPLICATIONS

This application is a continuation of International Application No. PCT/EP2019/053988, filed on Feb. 18, 2019, the disclosure of which is hereby incorporated by reference in its entirety.

TECHNICAL FIELD

Generally, the present disclosure relates to the field of telecommunications. More specifically, the present disclosure relates to entities, systems and methods for automatic configuration and selection of analytics network function instances in mobile communication networks, in particular 5G communication networks.

BACKGROUND

In the framework of a 5G communication network, analytics data/information about, for instance, the operation of a specific network function (NF) within the 5G communication network can be provided by a network data analytics function (NWDAF). According to current 3GPP specifications, such as TS 23.501, TS 23.502, and TR 23.791, mechanisms for discovery and selection of a NWDAF can only obtain information about the location of the NWDAF itself and its associated analytics ID. The key problem of this set of information is that it does not indicate the spatial responsibility of a NWDAF within the 5G network, i.e. the spatial area about which analytics data can be provided by the NWDAF. Therefore, a NF consumer wanting to obtain NWDAF analytics data about the mobile network communication (e.g. specific NFs, network slice load, application related features) will only know if a NWDAF can provide the analytics data, when the NF consumer registers, i.e. subscribes to a NWDAF for obtaining the analytics data with the NF indication of its spatial area of interest. If, however, the NWDAF is not able to provide the requested analytics data for the NF spatial area of interest, the NWDAF will reject the subscription request. This is an inefficient mechanism that leads to unnecessary increase in control plane rejection signaling.

There is a tight relationship between the data collection capabilities of NWDAF and the spatial coverage of the analytics data that an NWDAF can generate. According to current specifications, the operator of a 5G network (also referred to as OAM) deploys NWDAF within the network. It is not specified, however, which kind of information needs to be configured in the deployment of NWDAF to allow NWDAF to properly connect to sources of analytics data within the network. This is a problem of how to trigger a NWDAF instance to subscribe to different sources of analytics data for the generation of analytics data, because, in turn, these sources of analytics data will define the spatial coverage of the analytics data by the NWDAF associated therewith. There is currently no solution for this problem.

Moreover, over time, the OAM of a 5G network might perform changes in the network, such as increasing, decreasing, changing the number of NFs, interfaces and the like. These changes, such as increasing the number of NFs that need to be considered in a given spatial responsibility area of a NWDAF, might affect the analytics data collection capability of the NWDAF and, consequently, the analytics data generation thereof. Currently, there is no mechanism defined to relate the changes performed by the OAM in a 5G network to the sources of data collection associated with a NWDAF, and how these changes in sources of data collection for NWDAF are reflected in the definition (or update) of NWDAF spatial coverage of analytics capabilities. Supporting updates in the definition of NWDAF spatial coverage is essential for proper allowing NF consumers to properly discover and select NWDAF(s).

Thus, there is a need for improved entities, systems and methods for automatic configuration and selection of analytics network function instances in a mobile communication network, in particular a 5G communication network.

SUMMARY

Embodiments of the invention are defined by the features of the independent claims, and further advantageous implementations of the embodiments by the features of the dependent claims.

A first aspect relates to a first network entity for a mobile communication network, in particular a network data analytics function (NWDAF) of a 5G communication network, wherein the first network entity is configured to provide registration information (herein also referred to as analytics serving area (ASA) information) to a second network entity of the mobile communication network, in particular a network function repository entity, wherein the registration information is based on the scope of generated analytics, the scope of generated analytics defining the capability of the first entity to generate analytics information.

In a further possible implementation form of the first aspect, the scope of generated analytics is based on data collection information (herein also referred to as analytics data collection (ADC) profile), the data collection information defining a capability of the first network entity to collect data from the mobile communication network to generate analytics information.

In a further possible implementation form of the first aspect, the registration information comprises one or more of the following elements: one or more tracking areas (TAI) and/or TAI ranges; one or more network function type identification; one or more network function identification; one or more locality information.

In a further possible implementation form of the first aspect, the first network entity is further configured to provide to the second entity at least of one of the following elements: one or more serving group identification of first entities, wherein a serving group includes one network entities with overlapping registration information; one or more status information, e.g. an analytics quality flag, of the first network entity.

In a further possible implementation form of the first aspect, the first network entity comprises at least one data collection information.

In a further possible implementation form of the first aspect, the data collection information comprises one or more of the following elements: a data collection information identification; one or more locality information; one or more tracking areas (TAIs) and/or TAI ranges; one or more network function type identification; one or more network function identification; one or more network slice identification; and/or one or more analytics serving group identification.

In a further possible implementation form of the first aspect, the first network entity is configured to obtain the data collection information from a third network entity, in particular a network management entity of the mobile communication network, for configuring the first network entity.

In a further possible implementation form of the first aspect, the registration information is further based on control plane information.

In a further possible implementation form of the first aspect, the first network entity is configured to provide updated registration information to the second network entity of the mobile communication network.

In a further possible implementation form of the first aspect, the first network entity is configured to provide the registration information directly to the second network entity and/or indirectly to the second network entity via another network entity, in particular a service communication proxy (SCP).

A second aspect relates to a second network entity for a mobile communication network, in particular a network repository function for a 5G communication network, wherein the second network entity is configured to: obtain registration information from the first network entity according to the first aspect, wherein the registration information is based on the scope of generated analytics, the scope of generated analytics defining the capability of the first entity to generate analytics information; obtain, from a third network entity a query based on one or more elements of the registration information of the first network; and provide to the third network entity a query response including the obtained registration information.

In a further possible implementation form of the second aspect, the scope of generated analytics is based on data collection information, the data collection information defining a capability of the first network entity to collect data from the mobile communication network to generate analytics information.

In a further possible implementation form of the second aspect, the second network entity is further configured to obtain from the first network entity at least of one of the following elements: one or more serving group identification of first entities, wherein a serving group includes one network entities with overlapping registration information; one or more status information of the first network entity.

In a further possible implementation form of the second aspect, the registration information comprises one or more of the following elements: one or more tracking areas (TAI) and/or TAI ranges; one or more network function type identification; one or more network function identification; one or more locality information.

A third aspect relates to a third network entity for a mobile communication network, in particular a network function, wherein the third network entity is configured to: provide to the second network entity according to the second aspect a query based on one or more elements of registration information of the first network entity according to the first aspect, wherein the registration information is based on the scope of generated analytics, the scope of generated analytics defining the capability of the first entity to generate analytics information; obtain from the second network entity a query response including the registration information; and select the first network entity based on the obtained registration information.

In a further possible implementation form of the third aspect, the scope of generated analytics is based on data collection information, the data collection information defining a capability of the first network entity to collect data from the mobile communication network to generate analytics information.

In a further possible implementation form of the third aspect, the third network entity is further configured to obtain from the second entity at least of one of the following elements: one or more serving group identification of first entities, wherein a serving group includes one network entities with overlapping registration information; one or more status information of the first network entity; wherein, the query response further includes the one or more serving group identification and/or the one or more status information.

A fourth aspect relates to a mobile communication network, in particular a 5G communication network, wherein the mobile communication network comprises a first network entity according to the first aspect, a second network entity according to the second aspect and/or a third network entity according to the third aspect.

A fifth aspect relates to a method of operating the first network entity according to the first in a mobile communication network, in particular a network data analytics function according to the first aspect in a 5G communication network, wherein the method comprises the step of: providing registration information to the second network entity according to the second aspect of the mobile communication network, in particular a network function repository entity according to the second aspect, wherein the registration information is based on the scope of generated analytics, the scope of generated analytics defining the capability of the first entity to generate analytics information.

A sixth aspect relates to a method of operating the second network entity according to the second aspect in a mobile communication network, in particular a network repository function according to the second aspect in a 5G communication network, wherein the method comprises the steps of: obtaining registration information from the first network entity according to the first aspect, wherein the registration information is based on the scope of generated analytics, the scope of generated analytics defining the capability of the first entity to generate analytics information; obtaining from the third network entity according to the third aspect a query based on one or more elements of the registration information of the first network; and providing to the third entity a query response including the obtained registration information.

A seventh aspect relates to a method of operating the third network entity according to the third aspect in a mobile communication network, in particular a network function according to the third aspect in a 5G communication network, wherein the method comprises the steps of: providing to the second network entity according to the second aspect a query based on one or more elements of registration information of the first network entity according to the first aspect, wherein the registration information is based on the scope of generated analytics, the scope of generated analytics defining the capability of the first entity to generate analytics information; obtaining from the second network entity a query response including the registration information; and selecting the first network entity based on the obtained registration information.

A eighth aspect relates to a computer program product including program code that, wen run by a processor, carries out at least one of the method of the fifth to seventh aspect and their implementations.

Thus, embodiments of the invention provide entities, service models, data structures, services and methods for enabling discovery and selection of NWDAF(s) based on their analytics serving area, ASA, information (herein also referred to as registration information) and automating the procedures for the consistency and maintenance of analytics serving area information of NWDAF(s).

For instance, according to embodiments of the invention, an analytics data collection, ADC, profile (herein also referred to as data collection information) is used, which describes the spatial responsibility of NWDAF data collection on a general level. According to embodiments of the invention, a NWDAF can use an ADC profile to discover sources of data collection, for instance, by means of a parametrized search in a NRF and/or SCP. The NWDAF can expose the spatial responsibility of the ADC profile in a NWDAF profile. There are different options how the ADC profile can be configured in the NWDAF. According to a first option, a network management entity, such as an OAM, based on management and control plane information can deploy the NWDAF with the ADC profile. This configuration may not include the specific NF instances the NWDAF must collect data from. By doing this the OAM reduces the amount of configuration it must do at the NWDAF and delegates to the NWDAF the responsibility to discover the specific NF instances based on information from the control plane. Therefore, according to this option, the NWDAF instance can use the information in the ADC profile for discovering at the NRF the specific information about the NF instances it must collect data from, as will be described in more detail below. According to a further option, the ADC profile in the NWDAF can be configured only on the basis of management plane information. According to this option, the OAM deploys the NWDAF instance with the configuration of the ADC profile containing the identification of all specific NFs that the NWDAF should collect data from.

Thus, according to embodiments of the invention, the NWDAF exposes a service that a network management entity, such as an OAM can invoke to configure the ADC profile.

According to embodiments of the invention, the analytics serving area, ASA, information (i.e. registration information) is used, which allows a mapping of the ADC profile to the actual discovered NF instances. According to embodiments of the invention, the NWDAF can use the ASA information to trigger the data collection of sources in its spatial responsibility. According to embodiments of the invention, the NWDAF can update the ASA information, when it receives notifications from the NRF and/or SCP about an updated NF status. There are different options how the ASA information can be generated based on the ADC profile, namely according to a first option based on management and control plane information or according to a further option based on management plane information only. According to the first option, if the OAM deployed the NWDAF and the ADC profile is configured without the specific NFs identification that the NWDAF should collect data from, the NWDAF uses the information in the ADC profile (e.g., TAI, locality, S-NSSAI, NF Types) to discover at the NRF the specific information about the NF instances it should collect data from. Thus, the NWDAF is able to generate the ASA information by combining the information from the ADC profile with the specific NF identification received from the NRF. According to the further option, if the OAM deployed the NWDAF and the ADC profile is configured with the specific NFs identification that the NWDAF should collect data from, the NWDAF uses the values of the fields of the ADC profile related to the fields of the ASA information, to include such values in the fields of the ASA information.

According to embodiments of the invention, an analytics data consuming NF, i.e. a NF that wants to obtain analytics data from the NWDAF, is aware of the fields of the ASA information that can be used for querying the NRF, for instance, because the NRF exposes a service for query with such fields included. The analytics data consuming NF can include in the query request values for these query fields according to its own goals related to which analytics coverage area the NF1 wants to discover at the NRF. When the NRF responds to a query, more than one NWDAF profile can be send back to the analytics data consuming NF. This means that more than one registration information can be send back to the NF in response to a query request.

According to embodiments of the invention, one or more of the following types/sets of information are used.

Set of Localities: which describes the geographical location or data center in which 5GS entities are placed.

Set of TAI (TAI ranges): identify the AN entities in the 5G communication network that are associated with the NWDAF.

Set of NF Types: define the type of network functions that the NWDAF should collected data from.

Set of NF instances identification: define the specific set of instances that the NWDAF should collect data from.

Set of S-NSSAIs and NSI IDs: defining the network slices that the NWDAF instance is related to.

Set of Analytics Serving Group ID (to enable the treatment not per NWAF instance but per sets of NWDAF instances in a given analytics serving area) includes one or more network entities with overlapping registration information.

As will be appreciated, embodiments of the invention advantageously allow reducing the risk of CP rejection signaling when consumers of analytics invoke NWDAF services, for instance, due to not supported parameters for generation of analytics (e.g., region of data collection not supported) at subscription to NWDAF services. During the discovery of NWDAF the analytics consumers can retrieve the information relevant to decide whether the provided analytics ID by the NWDAF is generated using data collected that can effectively yield insights to the analytics consumer.

Embodiments of the invention allow automating the maintenance of the NWDAF analytics capabilities. More specifically, an increased automation of the analytics framework can be achieved by reducing the need for direct/ explicit coordination of updates in multiple parts of a 5G communication network, when the configuration of data sources allowed to be collected by NWDAF instances changes. Furthermore, embodiments of the invention allow automating the association of the NWDAF spatial coverage of generated analytics information with the sources of data collection.

Moreover, embodiments of the invention allow reducing OPEX in CP (Control Plane) and MP (Management Plane), when changes in the deployment of the 5G communication network occur. For instance, changes in NF configuration for exposure of data to be collected are transparently/automatically reflected in NWDAF. Moreover, changes in NWDAF spatial responsibility are automatically propagated to NFs without the need for OAM intervention to trigger such operations. Thus, there is less need for the OAM to reconfigure NWDAF. This reduces the risk of miss-configuration of NWDAF.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the invention are described in more detail with reference to the attached figures and drawings, in which.

Figure 1:
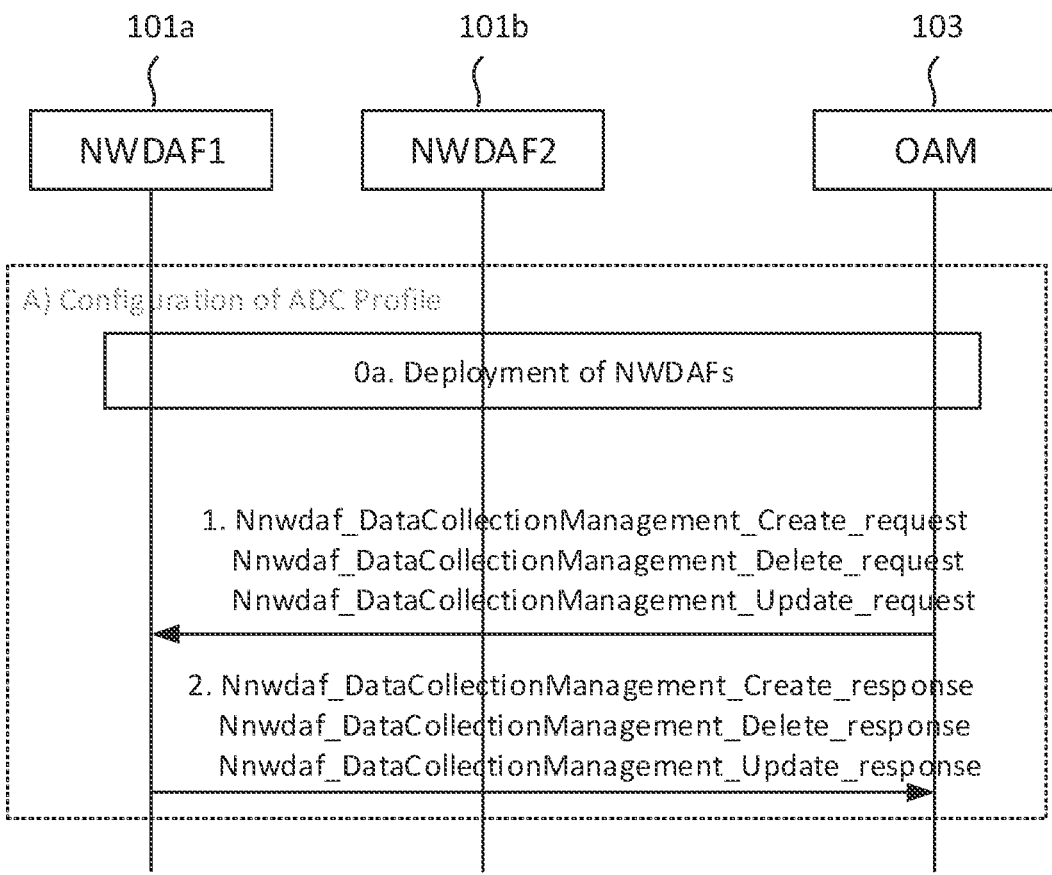
FIG. 1 is a diagram illustrating steps for managing an analytics data collection profile on a network data analytics entity as implemented by embodiments of the invention.

In the following, identical reference signs refer to identical or at least functionally equivalent features.

DETAILED DESCRIPTION OF ILLUSTRATIVE EMBODIMENTS

In the following description, reference is made to the accompanying figures, which form part of the disclosure, and which show, by way of illustration, specific aspects of embodiments of the invention or specific aspects in which embodiments of the present invention may be used. It is understood that embodiments of the invention may be used in other aspects and comprise structural or logical changes not depicted in the figures. The following detailed description, therefore, is not to be taken in a limiting sense, and the scope of the present invention is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or more of steps are not explicitly described or illustrated in the figures. Further, it is understood that the features of the various exemplary embodiments and/or aspects described herein may be combined with each other, unless specifically noted otherwise.

In the following, embodiments of the invention will be described in more detail in the specific framework of a 3GPP 5G communication network based on the 3GPP 5G network architecture defined in TS 23.501. It will be appreciated, however, that many of the concepts disclosed herein can be applied in other types of communication networks as well, in particular communication networks based on further evolutions of the 3GPP 5G network architecture defined in TS 23.501.

Embodiments of the invention will be described using the following definitions, abbreviations and/or acronyms in the framework of a 3GPP 5G communication network:

NWDAF refers to a Network Data Analytics Function.

NRF refers to a Network Repository Function.

NF1 is an embodiment of a Network Function.

ASA (Analytics Serving Area) information is an embodiment of registration information.

ADC (Analytics Data Collection) profile is an embodiment of data collection information.

Analytics Serving group is an embodiment of a serving group identification.

Analytics Quality Flag is an embodiment of status information.

NWDAF profile is an embodiment of the information that the NWDAF provides to the NRF including the registration information (ASA information), the serving group information (Analytics serving group) and the status information (Analytics Quality Flag).

As will described in the following in the context of FIGS. 1 to 6 in more detail, embodiments of the invention are directed to a first network entity, in particular an enhanced network data analytics function, NWDAF, implemented in a 5G communication network. In FIG. 1 two NWDAF instances are illustrated, namely the NWDAF NWDAF1 101*a* and the NWDAF2 101*b*. Generally, a NWDAF is responsible for providing network analysis information, for instance, upon request from network functions, NFs, being operated in the 5G communication network. For example, a NF may request specific analysis information on the load level of a particular network slice of the 5G communication network. Alternatively, a NF can use a subscription service to ensure that it is notified by the NWDAF if new analytics data are collected, such as the load level of a network slice changing or reaches a specific threshold.

Moreover, embodiments of the invention are directed to a second network entity, in particular an enhanced network repository function, NRF. Generally, a NRF in a 5G communication network allows every network function to discover the services offered by other network functions in the 5G communication network. It can support a service discovery function by maintaining a set of available NF profiles. A NRF implemented according to the invention is illustrated, for instance, in FIG. 2 as NRF 105.

Moreover, embodiments of the invention are directed to a third network entity, in particular a network function, NF, of the 5G communication network, wherein the NF is configured to consume the analytics data provided by the first network entity. An analytics data consuming NF implemented according to the invention is illustrated, for instance, in FIG. 3 as NF1 109.

The above elements, such as NFs, NWDAs and NRFs, as well as their general functionalities, as currently defined by the 3GPP 5G standard, are well known to the person skilled in the art and, therefore, in the following mainly the enhanced features of these elements as provided by embodiments of the invention will be described in more detail.

As will be described in more detail below, the first network entity, e.g. the NWDAF iota is configured to provide registration information (herein also referred to as analytics serving area, ASA, information) to the second network entity, e.g. the network function repository 105, wherein the registration information is based on the scope of generated analytics, the scope of generated analytics defining the capability of the first network entity 101*a* to generate analytics information. According to an embodiment, the scope of generated analytics is based on data collection information (herein also referred to as analytics data collection, ADC, profile), the data collection information defining a capability of the first network entity to collect data from the mobile communication network to generate analytics information.

The second network entity, e.g. the NRF 105 is configured to: obtain registration information from the first network entity, e.g. the NWDAF 101*a*, wherein the registration information is based on the scope of generated analytics, the scope of generated analytics defining the capability of the first network entity 101*a* to generate analytics information; obtain, from the third network entity, e.g. the NF 109 a query based on one or more elements of the registration information of the first network; and provide to the third network entity a query response including the obtained registration information.

The third network entity, e.g. the NF 109 is configured to: provide to the second network entity, e.g. the NRF 105 a query based on one or more elements of registration information of the first network entity, e.g. the NWDAF 101*a*, wherein the registration information is based on the scope of generated analytics, the scope of generated analytics defining the capability of the first network entity 101*a* to generate analytics information; obtain from the second network entity a query response including the registration information; and select the first network entity based on the obtained registration information.

Figure 2:
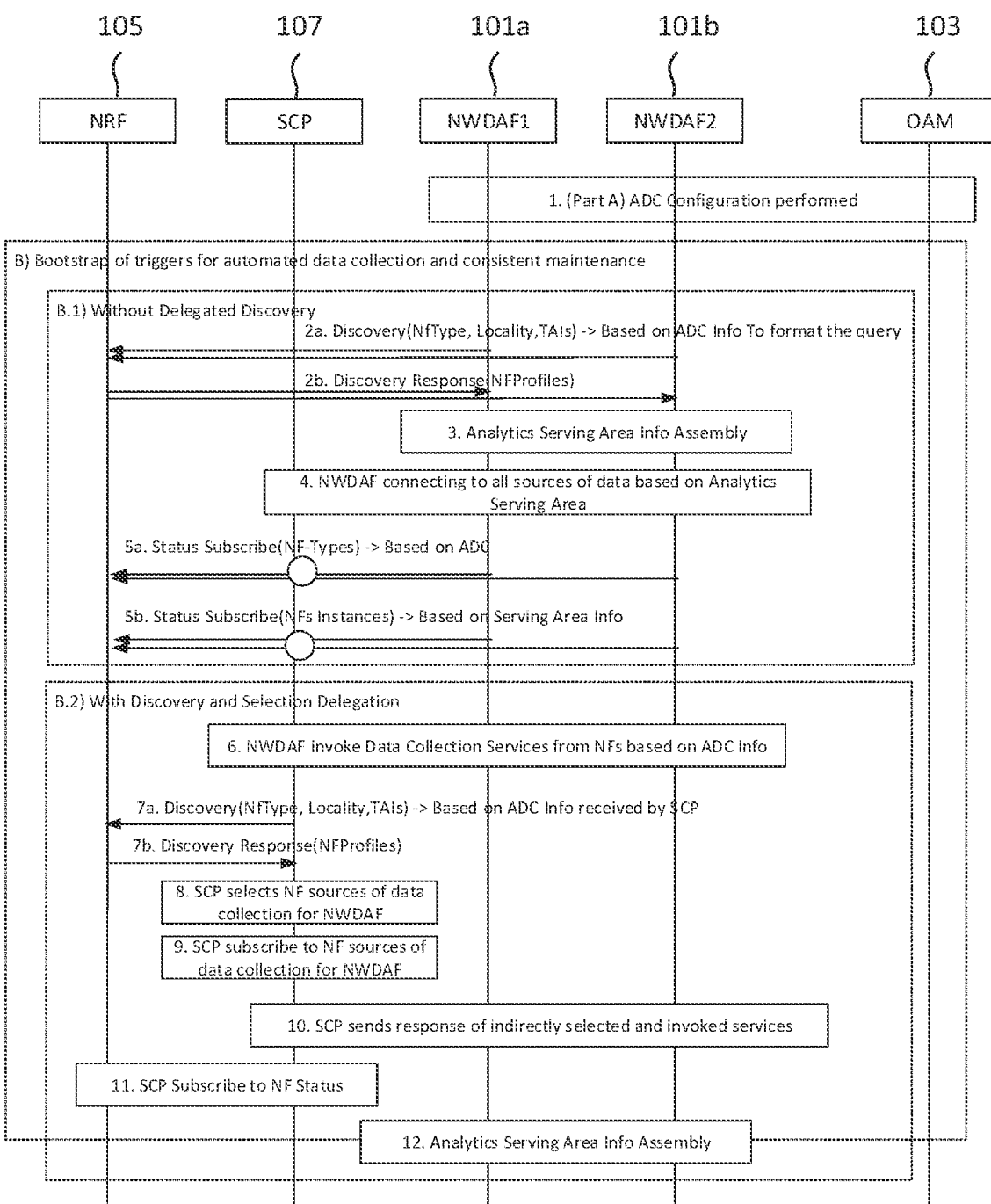
FIG. 2 is a diagram illustrating steps for the automatic discovery and association of a network data analytics entity as implemented by embodiments of the invention.
Figure 3:
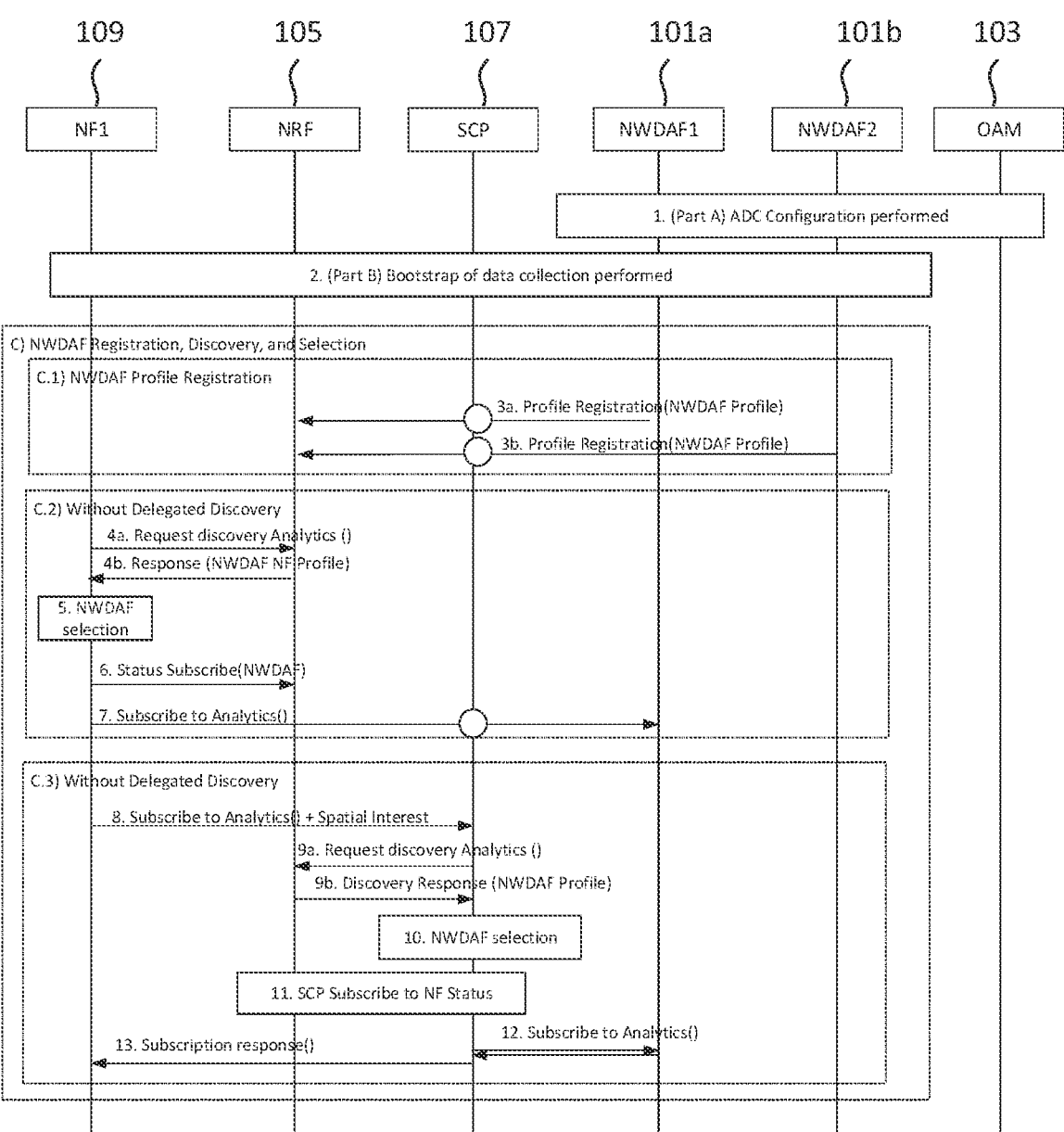
FIG. 3 is a diagram illustrating steps for the registration, discovery and selection of a network data analytics entity as implemented by embodiments of the invention.
Figure 4:
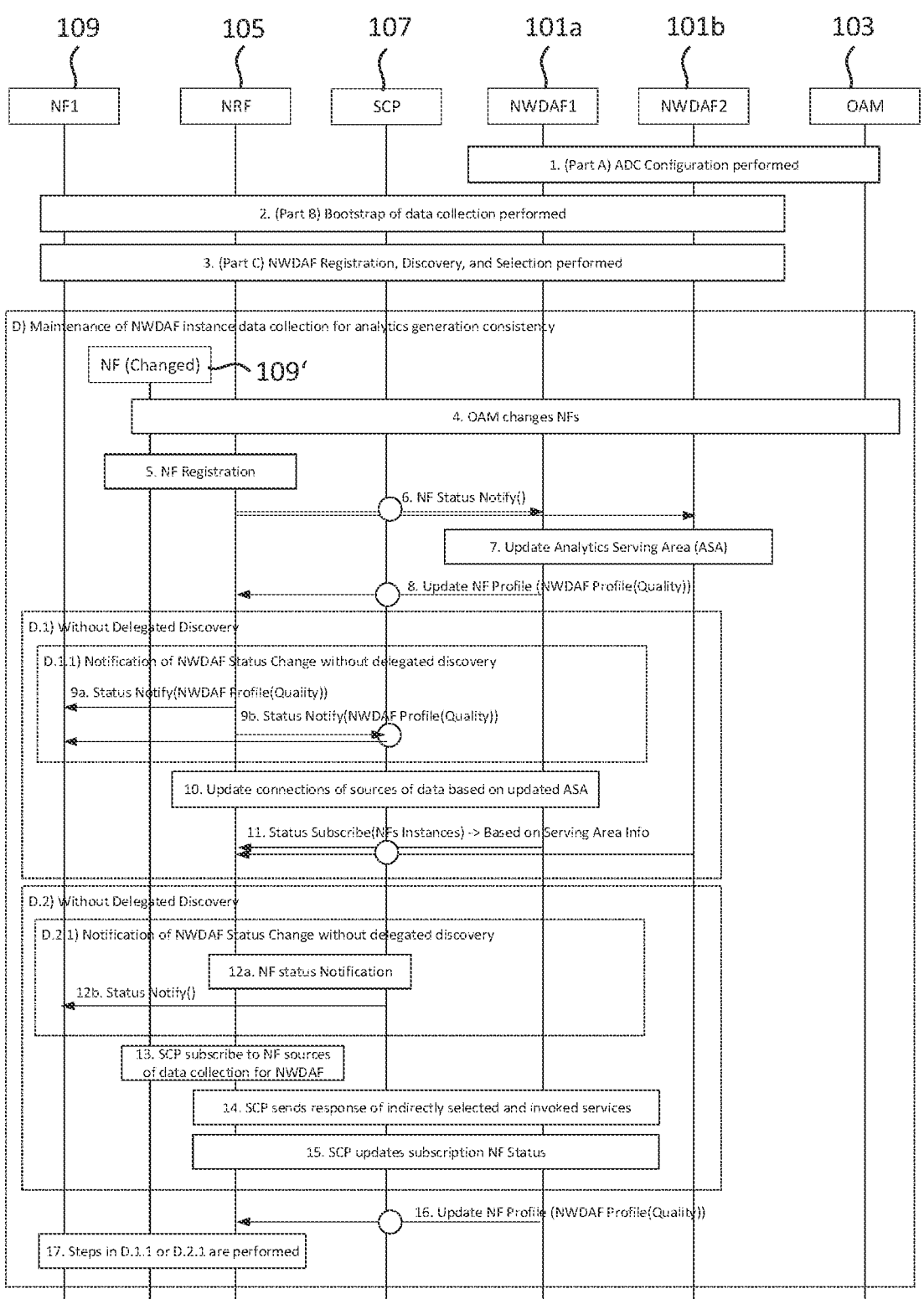
FIG. 4 is a diagram illustrating steps for the maintenance of a network data analytics entity as implemented by embodiments of the invention.
Figure 5:
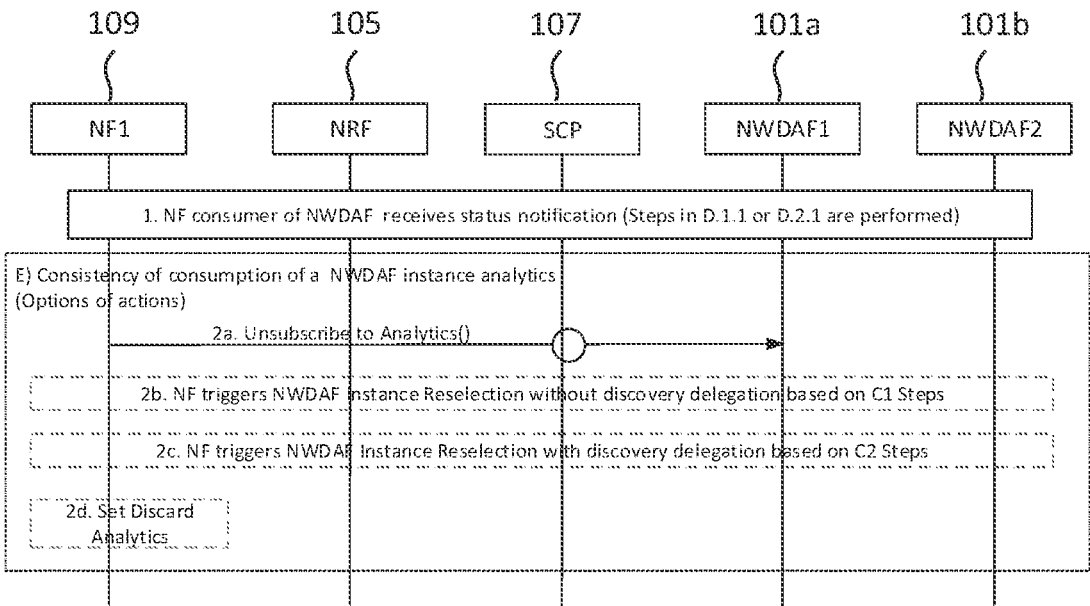
FIG. 5 is a diagram illustrating steps for ensuring the quality of analytics data collection by a network data analytics entity as implemented by embodiments of the invention.
Figure 6:
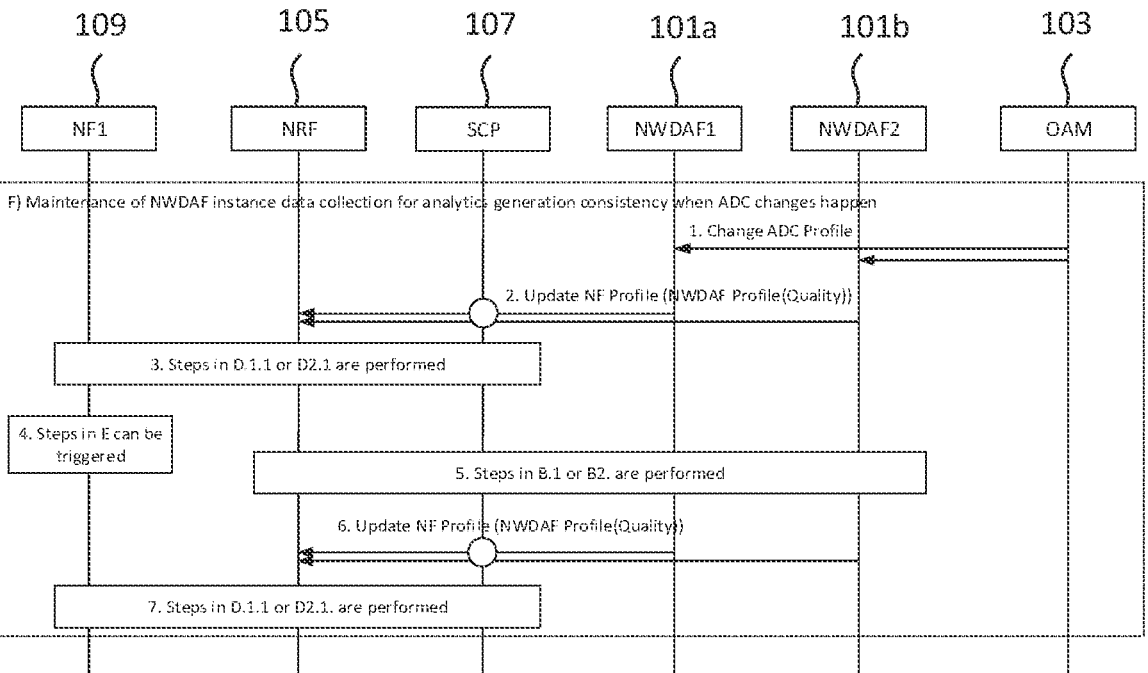
FIG. 6 is a diagram illustrating steps for the maintenance of a network data analytics entity as implemented by embodiments of the invention.

In the following, further embodiments of the invention will be described in the context of FIGS. 1 to 6, which are arranged in the following logical order. FIG. 1 illustrates the configuration and management of an analytics data collection (ADC) profile, i.e. the data collection information, of the NWDAF 101*a*, what is also referred to as part A. FIG. 2 illustrates bootstrapping of triggers for automated data collection and consistency maintenance, what is also referred to as part B. FIG. 3 illustrates an enhanced registration, discovery and selection procedure of the NWDAF 101*a*, what is also referred to as part C. FIG. 4 illustrates the maintenance of the NWDAF instance data collection for analytics generation consistency, what is also referred to as part D. FIG. 5 illustrates the consistency of consumption of NWDAF analytics, what is also referred to as part E. FIG. 6 illustrates the maintenance of NWDAF instance data collection for analytics generation consistency when ADC changes happen, what is also referred to as part F.

Referring in more detail to FIG. 1, which illustrates a procedure for configurating the ADC profile, i.e. the data collection information, of the NWDAF1 101*a* and/or the NWDAF2 101*b* according to embodiments of the invention (in the following reference will be made to the NWDAF1 101*a* or NWDAF 101*a* only with the understanding that the same functionality applies to NWDAF2 101*a* as well, unless explicitly stated otherwise).

In step 1 of FIG. 1, the OAM 103 invokes a Nnwdaf_DataCollectionManagement service of the NWDAF 101*a* to create or update an analytics data collection, ADC, profile to be used by the NWDAF 101*a* for the discovery and association with sources of data collection. In addition, the OAM 103 can also use this NWDAF service for deleting an ADC profile on the NWDAF 101*a* and/or the NWDAF 101*b*. According to embodiments of the invention, an ADC profile can comprise one or more of the following elements: an ADC profile identification; a set of localities; a set of TATs and/or TAI ranges; a set of NF type identification; a set of S-NSSAIs and/or NSI identification; and/or a set of analytics serving group, ASG, identification (to enable the treatment not per NWAF but per sets of NWDAF in a given analytics serving area).

In step 2 of FIG. 1, the NWDAF 101*a* replies to the OAM 103 with a confirmation, in the positive case a confirmation of the creation, update, or deletion of the ADC with a response message referred to as Nwdaf_DataCollectionManagement response message in FIG. 1.

Thus, according to an embodiment the NWDAF 101*a* provides a service enabling the customization and automation of the characteristics of data collection performed by the NWDAF instance 101*a*. Table 1 further illustrates this service provided by the NWDAF 101*a* in order to manage the ADC profile that is used by the NWDAF 101*a* for triggering the discovery and connection to sources of data collection (here PCF refers to a policy control function of the 5G communication network).

TABLE 1

Description of new NWDAF services for supporting ADC management

| Service Name | Service Operations | Operation Semantics | Example Consumer(s) |
|---|---|---|---|
| Nnwdaf_DataCollectionManagement | Create | Request/Response | OAM/PCF |
| | Update | Request/Response | OAM/PCF |
| | Delete | Request/Response | OAM/PCF |
| | Query | Request/Response | AFs, OAM, NFs |
| | EventSubscribe EventUnsusbcribe EventNotify | Subscribe/Notify | AFs, OAM, NFs |
| | ControlActivation | Request/Response | OAM/PCF |
| | ControlDeactivation | Request/Response | OAM/PCF |

After the NWDAF 101*a* has been configured by the OAM 103, the steps shown in FIG. 2 are performed, which illustrates the bootstrapping of triggers for automated data collection and consistency maintenance (ADC+ASA-based). If the OAM 103 has configured the NWDAF instance 101*a* (or an Analytics Serving Group) to operate without delegated discovery and selection (i.e., the NWDAF 101*a* shall interact directly with the NRF 105) the steps illustrated in part B1 of FIG. 2 are performed. Otherwise, if the OAM 103 has configured the NWDAF instance 101*a* (or an Analytics Serving Group) to operate with delegated discovery and selection (i.e., the NWDAF 101*a* shall interact "indirectly" with the NRF 105 via a service communication proxy, SCP, 107), the SCP 107 performs the discovery and selection on behalf of the NWDAF 101*a* and steps illustrated in part B2 o FIG. 2 are performed.

In case of discovery without delegation, the NWDAF 101*a* uses the information about the ADC profile to perform the discovery of sources of data collection, in particular the NFs, interacting directly with the NRF 105.

In step 2*a* of FIG. 2, the NWDAF instance 101*a* invokes the NRF service for discovery of NFs capabilities (Nnrf_NFDiscoveryGet) using as parameter for the query the information from the ADC profile such as NF type identification(s), locality, TAI(s) and/or TAI range(s).

In step 2*b* of FIG. 2, the NRF 105 matches the requested query parameters to the stored NF profiles and sends the response with the matched profiles to the NWDAF 101*a*.

In step 3 of FIG. 2, the NWDAF 101*a* generates analytics serving area (ASA) information, i.e. the registration information, by associating to each to the field of NF instance identification of ADC profile ID configured in the NWDAF 101*a* the set of NFs and their locality and/or NFs and their TAI(s) and/or TAI range(s) and in both cases the S-NSSAI(s) and/or NSI ID(s) associated to such NFs, being the NF identification information extracted from the information received from NRF with the discovery NF Profiles. By generating the ASA information, the NWDAF 101*a* discovers all the sources of data collection that it must collect data from. Thus, according to embodiments of the invention, the ASA information can comprise one or more of the following elements: an ASA information identification; information related to the AN serving regions of the NWDAF 101*a*, such as the tuple (TAI(s) and/or TAI ranges, NF type identification(s), NF identification(s)); and/or information related to the CN serving regions of the NWDAF 101*a*, such as the tuple (locality, NF type identification(s), NF identification(s)).

In step 4 of FIG. 2, the NWDAF 101*a*, using the ASA information, triggers the subscription to all NFs it is configured to collect data from. For instance, the NWDAF 101*a* shall invoke, for instance, the event exposure service from the NFs, for instance, an AMF or a SMF, if they are listed in the ASA information.

In steps 5*a* and 5*b* of FIG. 2, the NWDAF 101*a* uses the information from the ADC profile to subscribe to all types of changes that can happen in the NF types it is supposed to collect data from and/or uses the ASA information to subscribe to changes in the specific NF that it is collecting data from. The NWDAF communication for the subscription of NF status can be performed directly to the NRF 105 or indirectly via the SCP 107.

In case of a delegated discovery and selection, referred to as part B2 in FIG. 2, the NWDAF 101*a* interacts with the SCP 107 in order to discover and connect to the sources of data collection configured in the ADC profile (step 6 of FIG. 2). One possible alternative is that the NWDAF 101*a* uses the NF types configured in the ADC profile to determine the services that need to be invoked from the NFs providing the analytics data. Then, the NWDAF 101*a* requests the SCP 107 to invoke the service of each NF type for data collection and includes in the request the locality and/or TAI(s) and/or TAI range(s) and S-NSSAI(s) and/or NSI IDs.

In steps 7*a* and 7*b* of FIG. 2, the SCP 107 identifies in the NWDAF request the information about which NF types need to be discovered and the ones that the SCP 107 already has information about. For the NF types the SCP 107 has no information for selecting the NFs, the SCP 107 triggers the discovery via the NRF 105. More specifically, in step 7*a* of FIG. 2 the SCP 107 invokes the NRF service for discovery of NFs capabilities (Nnrf_NFDiscoveryGet) using as parameter for the query the information received from the NWDAF request, such as NF Type identification(s), locality, TAI(s) and/or TAI range(s). Alternatively, in step 7*b* of FIG. 2, the NRF 105 matches the requested query parameters to the stored NF profiles and sends the response with the matched profiles to the SCP 107.

In step 8 of FIG. 2, the SCP 107 selects the NFs that will be associated with the NWDAF request, based on the information received from the NRF 105.

In step 9 of FIG. 2, the SCP 107 subscribes to all NFs selected to be associated with the NWDAF request and configures the indirect communication between the NFs and the NWDAF 101*a* for analytics data collection.

In step 10 of FIG. 2, the SCP 107 sends the response to the NWDAF 101*a* confirming the discovery and subscription to data collection from the NFs requested by the NWDAF 101*a*. The SCP 107 either indicates in the response explicitly the information about the NFsor the NWDAF 101*a* can become aware of the specific NFs by piggybacked information in the indirect communication setup by the SCP 107 from the NF to the NWDAF101*a*.

In step 11 of FIG. 2, the SCP 107 subscribes to NRF information about the status of the NFs discovered and selected to be associated with the NWDAF instance 101*a*.

In step 12 of FIG. 2, the NWDAF 101*a* generates the ASA information based on the answer received from the SCP 107 and/or the piggybacked information performed by the SCP 107 from the NFs that are associated with the requested collectable data.

After the steps illustrated in FIG. 2 have been performed, the steps illustrated in FIG. 3 can be performed, which generally relates to the enhanced NWDAF registration, discovery & selection process, as implemented by embodiments of the invention. As will be described in more detail in the following, according to embodiments of the invention the NRF 105 provides an extended set of services for supporting the registration, notification status and query related to the different types of information used by embodiments of the invention. More specifically, according to an embodiment the NRF 105 provides one or more of the following service operations.

Nnrf_NFDiscovery Request service operation: Parameters of the input request are extended with the fields of ASA information, Analytics Serving Group.

Nnrf_NFManagement_NFRegister service operation: Parameters of the input request are extended with the fields associated with the NWDAF Profile.

Nnrf_NFManagement_NFUpdate service operation: Parameters of the input request are extended with the fields associated with the NWDAF Profile.

Nnrf_NFManagement_NFStatusSubscribe service operation: Parameters of the input request are extended with the fields associated with the NWDAF Profile.

Nnrf_NFManagement_NFStatusNotify service operation: Parameters of the input request are extended with the fields associated with the NWDAF Profile.

As already mentioned, step 1 of FIG. 3 corresponds to part A, i.e. the steps shown in FIG. 1 (the ADC profile is configured at the NWDAF instance 101a). Step 2 of FIG. 3 corresponds to part B, i.e. the NWDAF instance 101a has finalized the steps shown in FIG. 2 for bootstrapping and triggering of data collection from the sources of data collection as configured in the ADC profile and generated the ASA information.

In steps 3a and 3b of FIG. 3, the NWDAF 101a registers a NWDAF profile at the NRF 105 (also referred to as part C.1). According to an embodiment, the NWDAF profile can comprises in addition to the ASA information one or more of the following elements: an analytics serving group (ASG) identifier; a NWDAF identification; and/or an analytics quality flag. As will be described in more detail below, the analytics quality flag can be used to indicate the status related to the stability of the NWDAF 101a with respect to the generation of analytics data. Thus, the NWDAF 101a can be configured to notify (via the NRF 105) subscribers of the NWDAF 101a about the reliability of the generated analytics data for such instance (e.g., quality of analytics data might drop because of changes in the data being collected from NFs).

According to an embodiment, the registration of the NWDAF profile comprising the ASA information can be done via direct communication between the NWDAF instance 101a and the NRF 105. Alternatively or additionally, the registration can be done indirectly via the SCP 107, where the NWDAF 101a sends it NWDAF profile comprising the ASA information to the SCP 107 and the SCP 107 further registers the NWDAF profile at the NRF 105.

If the network operator, i.e. the OAM 103 has configured the NF1 instance 109 to operate without delegated discovery and selection, i.e. the NF1 109 interacts directly with the NRF 105, steps 4 to 7 of FIG. 3 will be performed (referred to as part C.2 in FIG. 3). If, otherwise, the OAM 103 has configured the NF1 instance 109 to operate with delegated discovery and selection, i.e. the NF1 109 interacts with the SCP 107 and the SCP 107 performs the discovery and selection on behalf of the NF1 109, steps 8 to 13 of FIG. 3 will be performed (referred to as part C.3 in FIG. 3).

As already mentioned above, in case of discovery without delegation, the NF1 109 interacts directly with the NRF 105. In step 4.a of FIG. 3, the NF1 109 invokes the NRF service for discovery of NWDAF capabilities (Nnrf_NFDiscovery-Get) using as parameter for the query the fields related to the ASA information, and/or the analytics serving group (ASG) identification and/or the NWDAF NF type.

In step 4.b of FIG. 3, the NRF 105 matches the requested query parameters to the stored NF profiles and sends the response with the matched profiles (one or more NWDAF profile) to the NF1 instance 109.

In step 5 of FIG. 3, the NF1 109 selects from the received set of NWDAF profiles (NWDAF 101a or group of NWDAF 101a, 101b) by matching the fields of ASA information and/or the analytics serving group (ASG) information and/or using other criteria with respect to the obtained NWDAF profile information.

In step 6 of FIG. 3, the NF1 109 invokes the NWDAF services for obtaining analytics information (i.e., the output of NWDAF processing) from the selected NWDAF.

In step 7 of FIG. 3, the NF1 109 subscribes to NRF services related to notifications about the status of the NWDAF 101a or group of NWDAF 101a, 101b that were selected by NF1 109. The NF1 communication for the subscription of the NWDAF status can be performed directly to the NRF 105 or indirectly via the SCP 107.

For the alternative case of a delegated discovery and selection (part C.3 of FIG. 3), the NF1 109 interacts with the SCP 107 in order to discover and obtain analytics data. In step 8 of FIG. 3, the NF1 109 sends the request to obtain analytics data to the SCP 107 including also its the fields related to the ASA information that determine the spatial interest of the NF1 itself.

Thereafter, the SCP 107 identifies the NF1 request and verifies whether the NWDAF 101a or group of NWDAF 101a, 101b has to be discovered to address the specific NF1 request (e.g., in case the already discovered NWDAFs 101a, 101b in the SCP 107 do not match the fields related to the ASA information that determine the spatial interest of the NF1 itself). The SCP 107 can trigger the discovery via the NRF 105.

More specifically, in step 9a of FIG. 3 the SCP 107 invokes the NRF service for the discovery of NFs capabilities (Nnrf_NFDiscoveryGet) using as parameters for the query the NFSI provided by the NF1 109 and the NWDAF NF type. In step 9b of FIG. 3, the NRF 105 matches the requested query parameters to the stored NF profiles and sends the response with the matched profiles to the SCP 107.

In step 10 of FIG. 3, the SCP 107 selects the NWDAF 101a or group of NWDAF 101a, 101b that will be associated with the NF1 request based on the information received from the NRF 105.

In step 11 of FIG. 3, the SCP 107 subscribes to receive notification about the NWDAF 101a or group of NWDAF 101a, 101b associated with the NF1 request for analytics information.

In step 12 of FIG. 3, the SCP 107 subscribes to NWDAF analytics information on behalf of the NF1 109, thereby configuring the indirect communication between the NF1 109 and the NWDAF 101a, 101b.

In step 13 of FIG. 3, the SCP 107 sends the response to the NF1 109 confirming the subscription to the analytics information provided by the NWDAF instance 101a or group of instances 101a, 101b.

After the steps illustrated in FIG. 3 have been performed, the steps illustrated in FIG. 4 can be performed, which generally relates to the maintenance of NWDAF data collection for analytics generation consistency, as implemented by embodiments of the invention.

As already mentioned, step 1 of FIG. 4 corresponds to part A, i.e. the steps shown in FIG. 1 (i.e. the ADC profile is configured at the NWDAF instance 101a). Step 2 of FIG. 4 corresponds to part B, i.e. the NWDAF(s) 101a, 101b have finalized the steps shown in FIG. 2 for bootstrapping and triggering of data collection from the sources of data collection as configured in the ADC Profile and generated the ASA information. Step 3 of FIG. 4 corresponds to part C, i.e. the NWDAF 101a or group of NWDAF 101a, 101b has been registered as well as discovered and the NFs, such as the NF1 109, are a consumer of the analytics data provided by the NWDAF 101a or group of NWDAF 101a, 101b.

In step 4 of FIG. 4, the OAM 103 makes some changes of the 5G communication network, such as adding new NFs to network slice instances, changing the configuration of NF(s) registered in the NRF 105 (e.g., changing list of TAIs, or locality of NFs), or removing NF(s) from network slice instance(s).

In step 5 of FIG. 4, a changed NF 109' will either reflect the change in the NRF 105 directly or indirectly via the SCP 107 in case of indirect communication.

In step 6 of FIG. 4, the updates of the NF profile in the NRF 105 will trigger the notification of the new NF status to the NF(s) that subscribe(s) to receive such information, such as the NWDAF 101*a* and/or NWDAF 101*b*, which may have subscribed to notifications about the sources of data collection, as described above in the context of FIG. 2.

In step 7 of FIG. 4, the NWDAF 101*a* that receives the NF status notification in step 6 of FIG. 4 updates its ASA information accordingly. For instance, if in step 4 of FIG. 4, NFs are added in the locality, e.g. a specific datacenter in the CN, that the NWDAF 101*a* is configured to collect data from, the NWDAF 101*a* will update the ASA information including the information about the added NF(s).

In step 8 of FIG. 4, the NWDAF 101*a* updates its NWDAF profile information, for instance, by setting the analytics quality flag to display a warning. This warning can indicate that the generation of the analytics information is not stable (e.g., because the data collection of new sources, i.e. NFs has just started and, therefore, the generated analytics data has not converged to a settled state yet). According to an embodiment, it can be up to the party having requested the analytics information to decide what to do with the analytics data while the warning is in place in an NWDAF 101*a* or a group of NWDAF 101*a*, 101*b*, as will be described in more detail below in the context of FIG. 5.

Moreover, as will be described in more detail below, the communication of changes in the NWDAF status can be performed directly to the NRF 105 or indirectly via the SCP 107. In case of no discovery delegation, the steps in part D1 of FIG. 4 are performed (here steps 9*a* and 9*b* are different options). In case of discovery with delegation, the steps in part D2 of FIG. 4 are performed (here steps 12*a* and 12*b* are necessary to be executed and not optional for this embodiment).

In step 9*a* of FIG. 4, the NRF 105 sends the notification about the NWDAF status via direct communication to the NF1 109, due to the changes in the NWDAF profile information.

Alternatively or additionally, in step 9*b* of FIG. 4, the NRF 105 sends the notification about the NWDAF status using indirect communication to the NF1 109, so that the NRF notification is first send to the SCP 107, which forwards the notification to NF1 109.

In step 10 of FIG. 4, the NWDAF 101*a*, using its updated ASA information, triggers the subscription to all NFs it is configured to collect data from. For instance, the NWDAF 101*a* can invoke the event exposure service from NFs, such as an AMF or a SMF, if they are listed, i.e. identified in the ASA information.

In step 11 of FIG. 4, the NWDAF 101*a* uses the information from its updated ASA information to subscribe to changes in the specific NF(s) that it is collecting data from. The NWDAF communication for the subscription of NF status can be performed directly to NRF 105 or indirectly via the SCP 107.

In step 12*a* of FIG. 4, the NRF 105 sends the notification about the NWDAF status to the SCP 107.

In step 1213, of FIG. 4, the SCP 107 identifies that the notification is about the specific NWDAF 101*a* (due to the changes in the NWDAF profile information) and notifies the NF1 109 about the changes, for instance, of the analytics quality flag.

In step 13 of FIG. 4, the SCP 107 based on the updated ASA information subscribes to the changed NF(s) 109' and configures the indirect communication between the NF(s) and the NWDAF 101*a* for data collection.

In step 14 of FIG. 4, the SCP 107 sends information to the NWDAF 101*a* about changes in the data collection from the changed NF(s) 109', as requested by the NWDAF 101*a*. The SCP 107 either can send an explicit information to the NWDAF 101*a* about the changed NF instance(s) 109' or, alternatively, the NWDAF 101*a* can become aware of the changed NFs 109' by piggybacked information in the indirect communication setup by the SCP 107 from the changed NF 109' to the NWDAF 101*a*.

In step 15 of FIG. 4, the SCP 107 subscribes to NRF information about the status of the changed NFs 109' associated with the data collection for the NWDAF 101*a* or group of NWDAF 101*a*, 101*b*.

As soon as the NWDAF 101*a* detects that the analytics data generation has converged, the NWDAF 101*a* in step 16 of FIG. 4 updates its profile information by setting, for instance, the analytics quality flag to normal again and sends the updated NWDAF profile information to the NRF 105 directly or indirectly via the SCP 107.

Steps 9*a* or 9*b* and/or steps 12*a* and 12*b* of FIG. 4 can be triggered again by the NRF 105 to notify the status of the NWDAF 101*a* to subscribers of such NF status information.

FIG. 5 illustrates steps implemented by embodiments of the invention for testing the consistency of the consumption of NWDAF analytics based on the ASA information.

In step 1 of FIG. 5, the NF1 109 consuming the analytics data is notified about the changes of the NWDAF profile information. The following steps 2*a*-2*d* of FIG. 5 are options the NF1 109, i.e. the consumer of the analytics data can perform, in response to receiving the status notification about the NWDAF profile information.

According to a first option illustrated by step 2*a* of FIG. 5, upon receiving the notification about the changes in the NWDAF profile information, the NF consumer 109 can unsubscribe to receive analytics information from the modified NWDAF 101*a* or group of NWDAF 101*a*, 101*b*.

According to a further option illustrated by step 2*b* of FIG. 5, upon receiving the notification about changes in the NWDAF profile information, the NF consumer 109 can trigger the re-selection of the NWDAF 101*a* or group of NWDAF 101*a*, 101*b* based on the steps of part C1 illustrated in FIG. 3.

According to a further option illustrated by step 2*c* of FIG. 5, upon receiving the notification about changes in the NWDAF profile information, the NF consumer 109 can trigger the re-selection of the NWDAF 101*a* or group of NWDAF 101*a*, 101*b* based on the steps of part C2 illustrated in FIG. 3.

According to a further option illustrated by step 2*d* of FIG. 5, upon receiving the notification about changes in the NWDAF profile information, the NF consumer 109 can decide to set a flag to discard analytics information from the modified NWDAF 101*a* or group of NWDAF 101*a*, 101*b*.

As will be appreciated, the options described above are not exclusive, i.e. several options can be combined based, for instance, on an operator configuration. It is also possible that the NF consumer 109 does not perform any change, for instance if the changed information in the NWDAF profile is about the analytics quality flag being set to warning or normal.

FIG. 6 illustrates the maintenance of ASA information of NWDAF or group of NWDAFs when ADC changes happen (ADC-based), which is referred to as part F.

In step 1 of FIG. 6, the OAM 103 invokes a Nnwdaf_ DataCollectionManagement service from the NWDAF 101*a* to change the analytics data collection (ADC) profile information to be used by the NWDAF 101*a* for the discovery and association with sources of data collection. By way of example, the change could be to include new S-NSSAI IDs or to change the set of localities that are part of the NWDAF regional/spatial responsibility.

In step 2 of FIG. 6, the NWDAF 101a updates its NWDAF profile information by setting the analytics quality flag to indicate a warning. This warning indicates that the generation of the analytics information is not stable (e.g., because the data collection of new sources has just started and the generated analytics data has not converged to a stable state yet). It can be up to the consumers of the analytics information, e.g. the NF1 109 to decide how to deal with analytics data while the warning is in place for the NWDAF instance 101a or group of instances 101a, 101b (more details have been described above in the context of FIG. 5). The communication of changes in the NWDAF status can be performed directly to the NRF 105 or indirectly via the SCP 107.

As illustrated by steps 3 and 4 in FIG. 6, the steps of parts D1.1 and D2.1 of FIG. 4 and/or the steps of part E of FIG. 5 can be performed in parallel to the following steps shown in FIG. 6.

In step 5 of FIG. 6, based on the changed values of the ADC profile enforced by the OAM 103, the NWDAF 101a triggers the execution of the steps of parts B1 and/or B2 shown in FIG. 2.

As soon as the NWDAF 101a detects that the analytics generation has converged after the execution of the steps to update the data collection based on the changed ADC profile, the NWDAF 101a in step 6 of FIG. 6 updates its profile information setting the analytics quality flag to normal and sends the updated NWDAF profile information to the NRF 105 directly, or indirectly via the SCP 107.

Thereafter, as illustrated by step 7 of FIG. 6, the steps of parts D1.1 and D2.1 of FIG. 4 can be performed.

The person skilled in the art will understand that the "blocks" ("units") of the various figures (method and apparatus) represent or describe functionalities of embodiments of the invention (rather than necessarily individual "units" in hardware or software) and thus describe equally functions or features of apparatus embodiments as well as method embodiments (unit=step).

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

What is claimed is:

1. A first network entity, wherein the first network entity is applied to a network data analytics function of a 5G communication network, and the first network entity comprises:

at least one processor; and at least one non-transitory computer-readable storage medium storing at least one program executable by the at least one processor, the at least one program including instructions for:

providing registration information to a network function repository entity of the 5G communication network, wherein the registration information includes specific information about one or more network functions from which the first network entity should collect data that comprises the following elements: one or more tracking area identities (TAIs) or TAI ranges, and one or more network function identifiers, wherein the first network entity is the network data analytics function of the 5G communication network.

2. The first network entity of claim 1, wherein the specific information about the one or more network functions from which the first network entity should collect data is based on data collection information, the data collection information defining a capability of the first network entity to collect data from the 5G communication network to generate analytics information.

3. The first network entity of claim 1, wherein the registration information further comprises one or more of the following:

one or more network function type identifiers; or locality information.

4. The first network entity of claim 3, wherein the registration information is further based on control plane information.

5. The first network entity of claim 1, wherein the at least one program further includes instructions for:

providing, to the network function repository entity, at least one of the following:

one or more serving group identifiers of first entities, wherein each serving group corresponding to the one or more serving group identifiers of first entities includes network entities with overlapping analytics serving area information; or status information of the first network entity.

6. The first network entity of claim 1, wherein the first network entity is configured to store data collection information.

7. The first network entity of claim 6, wherein the data collection information comprises one or more of the following:

a data collection information identifier;

locality information;

the one or more TAIs or TAI ranges;

one or more network function type identifiers;

the one or more network function identifiers;

one or more network slice identifiers; or one or more analytics serving group identifiers.

8. The first network entity of claim 6, wherein the at least one program further includes instructions for:

obtaining the data collection information from a network management entity of the 5G communication network, the data collection information being usable for configuring the first network entity.

9. The first network entity of claim 1, wherein the at least one program further includes instructions for:

providing updated registration information to the network function repository entity of the 5G communication network.

10. The first network entity of claim 1, wherein the at least one program includes instructions for:

providing the registration information directly to the network function repository entity or indirectly to the network function repository entity via a service communication proxy (SCP).

11. The first network entity of claim 1, wherein the registration information further includes information identifying a geographical area on which the analytics generated by the first network entity is based.

12. A second network entity, wherein the second network entity is applied to a network repository function for a 5G communication network, and the second network entity comprises:

at least one processor; and at least one non-transitory computer-readable storage medium storing at least one program executable by the at least one processor, the at least one program including instructions for:

obtaining registration information from a first network entity of the 5G communication network, wherein the registration information includes specific information about one or more network functions from which the first network entity should collect data that comprises the following elements: one or more tracking area identities (TAIs) or TAI ranges, and one or more network function identifiers;

obtaining, from a third network entity, a query based on one or more elements of the registration information of the first network entity; and providing to the third network entity a query response including the registration information, wherein the first network entity is a network analytics function of the 5G communication network, and the third network entity is a network function of the 5G communication network.

13. The second network entity of claim 12, wherein the specific information about the one or more network functions from which the first network entity should collect data is based on data collection information, the data collection information defining a capability of the first network entity to collect data from the 5G communication network to generate analytics information.

14. The second network entity of claim 12, wherein the at least one program further includes instructions for obtaining, from the first network entity, at least one of the following:

one or more serving group identifiers of first entities, wherein each serving group corresponding to the one or more serving group identifiers of first entities includes network entities with overlapping analytics serving area information; or status information of the first network entity.

15. The second network entity of claim 12, wherein the registration information further comprises one or more of the following:

one or more network function type identifiers; or locality information.

16. A third network entity, wherein the third network entity is applied to a network function of a 5G communication network, and the third network entity comprises:

at least one processor; and at least one non-transitory computer-readable storage medium storing at least one program executable by the at least one processor, the at least one program including instructions for:

providing, to a second network entity, a query based on one or more elements of registration information of a first network entity, wherein the registration information includes specific information about one or more network functions from which the first network entity should collect data that comprises the following elements: one or more tracking area identities (TAIs) or TAI ranges, and one or more network function identifiers;

obtaining, from the second network entity, a query response including the registration information; and selecting the first network entity based on the obtained registration information, wherein the first network entity is a network analytics function of the 5G communication network, and the second network entity is a network repository function of the 5G communication network.

17. The third network entity of claim 16, wherein the specific information about the one or more network functions from which the first network entity should collect data is based on data collection information, the data collection information defining a capability of the first network entity to collect data from the 5G communication network to generate analytics information.

18. The third network entity of claim 16, wherein the at least one program further includes instructions for obtaining, from the second network entity, at least one of the following:

one or more serving group identifiers of first entities, wherein each serving group corresponding to the one or more serving group identifiers of first entities includes network entities with overlapping analytics serving area information; or status information of the first network entity; and wherein the query response further includes the one or more serving group identifiers or the status information.

19. A method, comprising:

providing, by a network data analytics function in a 5G communication network, registration information to a network function repository entity of the 5G communication network, wherein the registration information includes specific information about one or more network functions from which the network data analytics function should collect data that comprises the following elements: one or more tracking area identities (TAIs) or TAI ranges, and one or more network function identifiers.

20. A method, comprising:

obtaining, by a network repository function in a 5G communication network, registration information from a first network entity of the 5G communication network, wherein the registration information includes specific information about one or more network functions from which the first network entity should collect data that comprises the following elements: one or more tracking area identities (TAIs) or TAI ranges, and one or more network function identifiers;

obtaining, from a third network entity, a query based on one or more elements of the registration information of the first network entity; and providing to the third network entity a query response including the obtained registration information, wherein the first network entity is a network analytics function of the 5G communication network, and the third network entity is a network function of the 5G communication network.

21. A method, comprising:

providing, by a network function in a 5G communication network to a second network entity of the 5G communication network, a query based on one or more elements of registration information of a first network entity, wherein the registration information includes specific information about one or more network functions from which the first network entity should collect data that comprises the following elements: one or more tracking area identities (TAIs) or TAI ranges, and one or more network function identifiers;

obtaining, from the second network entity, a query response including the registration information; and selecting the first network entity based on the obtained registration information, wherein the first network entity is a network analytics function of the 5G communication network, and the second network entity is a network repository function of the 5G communication network.

\* \* \* \* \*